(12) United States Patent
Mehta et al.

(10) Patent No.: US 11,622,000 B2
(45) Date of Patent: Apr. 4, 2023

(54) GREY FAILURE HANDLING IN DISTRIBUTED STORAGE SYSTEMS

(71) Applicant: salesforce.com, inc., San Francisco, CA (US)

(72) Inventors: Karan Jitendra Mehta, San Francisco, CA (US); Charan Reddy Guttapalem, Newark, CA (US); Venkateswararao Jujjuri, Beaverton, OR (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/161,831

(22) Filed: Jan. 29, 2021

(65) Prior Publication Data

US 2022/0247812 A1 Aug. 4, 2022

(51) Int. Cl.
*H04L 67/1031* (2022.01)
*H04L 67/1034* (2022.01)
*H04L 67/1004* (2022.01)
*H04L 67/1097* (2022.01)

(52) U.S. Cl.
CPC ...... *H04L 67/1034* (2013.01); *H04L 67/1004* (2013.01); *H04L 67/1031* (2013.01); *H04L 67/1097* (2013.01)

(58) Field of Classification Search
CPC ............. H04L 67/1034; H04L 67/1004; H04L 67/1031; H04L 67/1097
See application file for complete search history.

(56) References Cited

U.S. PATENT DOCUMENTS

| | | |
|---|---|---|
| 7,085,909 B2 | 8/2006 | Ananthanarayanan et al. |
| 7,480,654 B2 | 1/2009 | Jujjuri et al. |
| 7,529,859 B2 | 5/2009 | Young et al. |
| 7,574,439 B2 | 8/2009 | Everhart et al. |
| 7,660,836 B2 | 2/2010 | Bolik et al. |
| 7,793,142 B2 | 9/2010 | Clark et al. |
| 8,041,676 B2 | 10/2011 | Naineni et al. |
| 8,700,584 B2 | 4/2014 | Ananthanarayanan et al. |
| 8,886,672 B2 | 11/2014 | Chaurasia et al. |
| 8,918,862 B2 | 12/2014 | Bhattiprolu et al. |
| 9,111,261 B2 | 8/2015 | Bhalliprolu et al. |
| 9,471,802 B2 | 10/2016 | Beecham et al. |

(Continued)

FOREIGN PATENT DOCUMENTS

EP 3662390 A1 6/2020

*Primary Examiner* — Ryan J Jakovac
(74) *Attorney, Agent, or Firm* — Kowert, Hood, Munyon, Rankin & Goetzel, P.C.; Gareth M. Sampson; Dean M. Munyon

(57) ABSTRACT

Techniques are disclosed relating to managing distributed storage of data across availability zones and the replication of data in case of storage server failures. A distributed storage system may include storage servers distributed across availability zones with an auditor instantiated in at least one storage server. The auditor manages the replication of data in the event of one or more storage servers failure in an availability zone. In the event of the failure, the auditor may determine the extent of the failure and whether the failure involves a small number or a large number of storage servers. In the event a large number of storage servers being affected, the auditor may delay replication of data to see if the failure is temporary and avoid unwanted data transfer of large amounts of data across availability zones.

20 Claims, 9 Drawing Sheets

(56) References Cited

U.S. PATENT DOCUMENTS

| | | | |
|---|---|---|---|
| 9,542,403 | B2 | 1/2017 | Jujjuri et al. |
| 9,588,752 | B2 | 3/2017 | Bhalliprolu et al. |
| 9,892,274 | B2 | 2/2018 | French et al. |
| 10,158,642 | B2 | 12/2018 | Jujjuri et al. |
| 10,713,223 | B2 | 7/2020 | Jujjuri et al. |
| 10,862,957 | B2 | 12/2020 | Jujjuri et al. |
| 2007/0011214 | A1 | 1/2007 | Jujjuri |
| 2008/0244031 | A1 | 10/2008 | Rai et al. |
| 2012/0016890 | A1 | 1/2012 | Bhalliprolu et al. |
| 2012/0323481 | A1 | 12/2012 | Bhalliprolu et al. |
| 2013/0151888 | A1 | 6/2013 | Bhalliprolu et al. |
| 2014/0089557 | A1 | 3/2014 | Bhalliprolu et al. |
| 2018/0329605 | A1 | 11/2018 | Venkateswararao |
| 2019/0045007 | A1 | 2/2019 | Wyatt et al. |
| 2021/0089210 | A1* | 3/2021 | Seguy .................. G06F 3/0604 |

* cited by examiner

GREY FAILURE HANDLING IN DISTRIBUTED STORAGE SYSTEMS

BACKGROUND

Technical Field

This disclosure relates generally to a storage system and, more specifically, to handling failures in availability zones of the storage system.

Description of the Related Art

Modern database systems routinely implement management systems that enable users to store a collection of information in an organized manner that can be efficiently accessed and manipulated. In many cases, these database systems include database nodes and storage nodes that work together to implement database services. The database nodes often process database transactions to read and manipulate data while the storage nodes work to ensure that the results of those transactions are stored in a manner that can be efficiently accessed. The management systems also often seek to ensure that the data of a database system is sufficiently replicated across various zones to prevent data loss in the event that portions of the database system fail or become unavailable.

DETAILED DESCRIPTION

Figure 1:
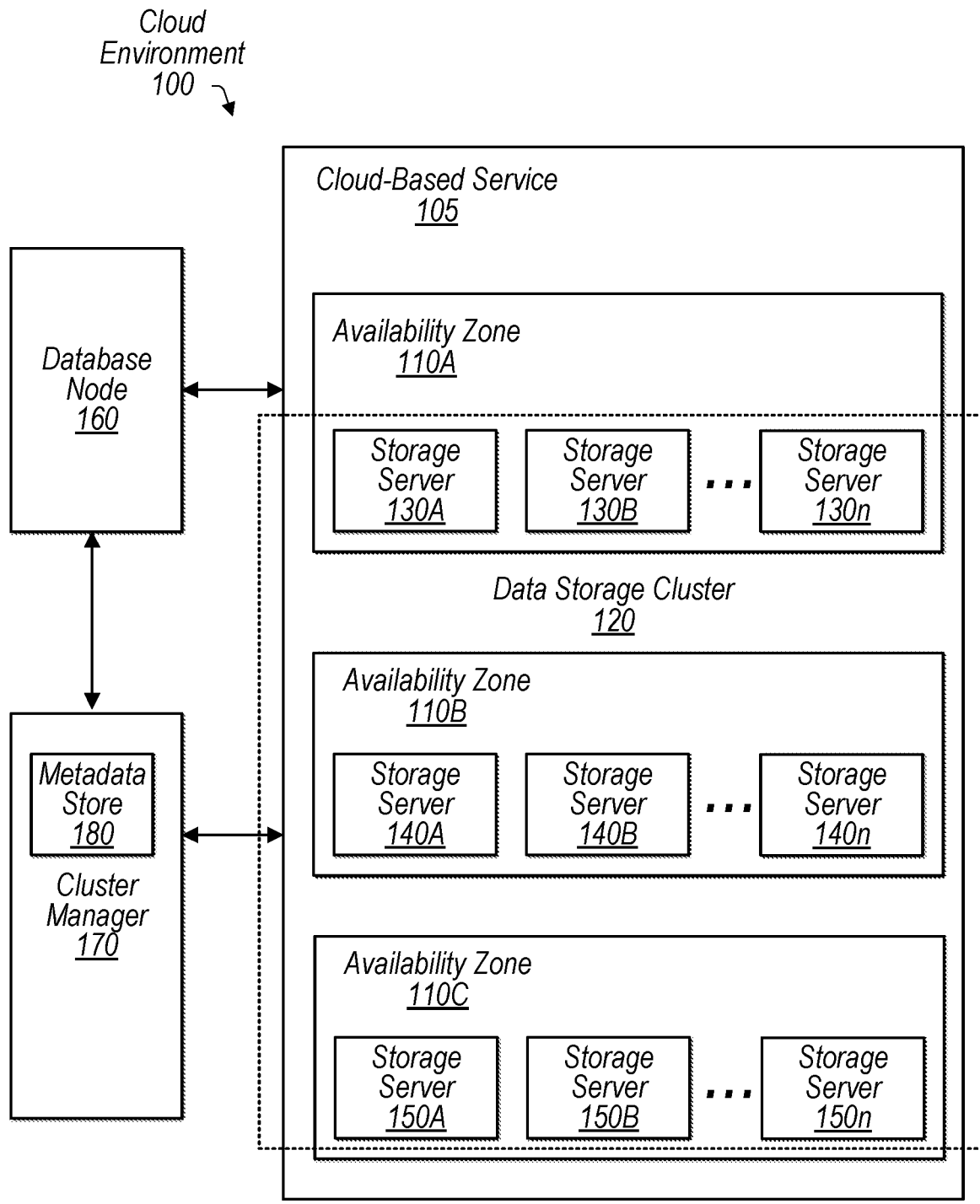
FIG. 1 depicts a block diagram of example elements of a cloud environment, according to some embodiments.

Cloud computing services (or, simply the "cloud") are growing increasingly popular as companies seek to move their infrastructure into the cloud. As used herein, the term "cloud" is used in accordance with its well-understood meaning and refers to the on-demand availability of computer resources, such as data storage and computing power, that can be made available to one or more organizations over the Internet. One example of a public cloud is Amazon Web Services™ (AWS), which is provided by Amazon™ (the provider) to multiple companies (the organizations) to host and run their software. The resources of a public cloud (e.g., computing hardware, storage hardware, etc.) are often spread out over multiple geographic areas (termed "cloud regions"), with each cloud region having multiple, isolated networks of those resources (termed "availability zones"). A company may instantiate its software on computer systems located within a certain zone of a geographically appropriate cloud region.

As described herein, distributed database storage systems may store data in a data storage cluster that includes storage servers distributed across multiple availability zones. Data stored on the storage servers in each availability zone may be replicated across servers in additional availability zones for persistent data storage redundancy in the data storage cluster. In many cases, these storage servers are not natively designed for a public cloud; instead, the storage servers are designed for a single centralized network and thus have no concept of cloud regions or availability zones. Accordingly, a distributed database storage system that is distributed across multiple availability zones may not properly account for availability zone failures (faults) along with the issues involved in communicating across zones in the cloud in response to the failures. For instance, in the event of a failure of one or more storage servers in an availability zone, data may be replicated to other availability zones in response to the fault.

Failures in availability zones may be caused due to a variety of reasons and can be either temporary or permanent. Temporary failures in a data storage cluster may be due to, for example, power loss, deployment problems, software upgrades, operating system upgrades, processing unit overheating, or disk corruptions. Temporary failures may also be due to events external to the data storage cluster such as router failures or switch firmware upgrades. Permanent failures in the data storage cluster may be caused by events such as natural disasters.

Failures in availability zones may also be of various scale. For instance, failures may include a single server in an availability zone up to all of the servers in the availability zone. Thus, failures in availability zones may be small to large in scale. As failures become larger in scale, the amount of data to be replicated to other availability zones increases. Replicating large amounts of data may cause bandwidth or resource issues in the data storage cluster, thereby affecting a variety of processes in the data storage cluster (such as data retrieval or data storage processes). For instance, if an entire availability zone goes down and there are three availability zones, replication would include ¼ of all the data in the data storage cluster. Additionally, temporary failures may be gray in nature (e.g., not clear-cut whether to replicate data). Thus, in the instances of temporary failures, mechanisms to avoid unwarranted replication of data across availability zones may be beneficial. The present disclosure addresses at least this technical problem of replicating large amounts of data in the instance of a failure event.

The present disclosure describes various techniques for enabling cloud-based services to determine whether to delay or begin replication of data based on a scale of a failure event in an availability zone. In instances of small failures, there may be no reason to delay the replication process as the smaller amount of data being transferred to other availability zones should not cause bandwidth or resource issues in the data storage cluster. In instances of large failures, however, it may be beneficial to delay the replication process to other availability zones. Delaying the replication process may postpone a large data transfer while allowing additional time for either the failures in the availability zone to resolve (such as when the failures are temporary) or additional investigation into the failure to determine whether data replication should proceed (such as when the failures are determined to be permanent). Additional investigation may include, for example, manual investigation by an operator or investigation by automatic investigation tools. Thus, the present disclosure contemplates techniques to delay the replication process and avoid the problems caused by large data transfer across availability zones unless the large data transfer is actually needed in order to ensure durability of the data from the failed availability zone.

In various embodiments described below, a cloud-based storage service, having multiple storage servers instantiated across multiple availability zones in a data storage cluster implements an auditor that, in the event of a failure in an availability zone, determines the extent (scale) of the failure. The auditor is instantiated in at least one availability zone while being capable of determining the operational status of storage servers across availability zones in the data storage cluster. In certain embodiments, an orchestration service or cluster manager, such as Kubernetes™ or Apache Zookeeper™, is used to instantiate the storage servers within the different availability zones. For instance, when a storage server boots up for the first time, the storage server performs a registration procedure in which it registers itself with the cluster manager. The registration procedure may include identification of the location and availability zone for the storage server, which is stored as metadata by the cluster manager. After registration, the cluster manager monitors the health or "heartbeat" of the storage servers and manages the metadata for the storage servers. The cluster manager continues to query the storage servers to detect whether the storage servers have heartbeats (e.g., the storage servers are up). As long as the cluster manager detects a heartbeat for a storage server, the cluster manager considers the storage server to be up and maintains the metadata for the storage server. In the instance that the cluster manager does not detect a heartbeat for a specified storage server (e.g., when specified storage server goes down), the cluster manager deletes the metadata for the specified storage server.

In various embodiments, the auditor determines the status of storage servers based on information (e.g., metadata) for the storage servers received from the cluster manager. For instance, the auditor may determine which storage servers are up and which storage servers are down across the availability zones based on the presence/non-presence of metadata for individual storage servers in metadata received from the cluster manager. In various embodiments, in the event a storage server goes down or a storage server comes back up, the auditor receives a notification from the cluster manager that the event has occurred. The auditor may query metadata from the cluster manager to determine the health of other storage servers in the affected availability zone in response to the event. In certain embodiments, the auditor determines whether to replicate data to other availability zones based on an assessment of the health of the storage servers in the affected availability zone. For instance, as described herein, the auditor may implement logic to determine an availability value for the storage servers in the affected availability zone and then determine whether to replicate data to other availability zones based on the availability value. The auditor may then coordinate the replication of data across availability zones in the event of a determination to replicate data to other availability zones.

In certain embodiments, the availability value determined by the auditor is a percentage of storage servers available (up and running) out of the total number of storage servers in an availability zone. In various embodiments, the auditor assesses the availability percentage against low and high watermark thresholds with a "gray" area between the thresholds. The low and high watermark thresholds may be, for example, low and high thresholds for the percentage of servers to determine whether to begin replication of data. In certain embodiments, the low watermark threshold is a threshold below which the auditor determines not to begin replication (e.g., the availability zone is down) while the high watermark threshold is a threshold above which the auditor determines to begin replication (e.g., the availability zone is up). When the availability percentage is below the low watermark threshold, the auditor may provide an indication to an operator, who may proceed with a manual investigation or initiate automatic investigation tools. In the gray area between the low and high watermark thresholds, the auditor may proceed according to the last known state for the storage servers (e.g., proceed as if the availability zone is up or down from the last known state). With the gray area between the low and high watermark thresholds, the auditor does not implement a single threshold, which could be triggered by a single storage server going up or down.

These techniques can be advantageous as they allow for delaying or avoiding the replication of large amounts of data across availability zones in the event of a temporary storage server failure while maintaining the capability to determine to replicate data when a situation warrants data replication. Delaying or avoiding the replication may reduce unwanted utilization of resources and bandwidth in the data storage cluster. Additionally, with the use of low and high watermark thresholds along with a gray area in between the thresholds, the auditor implements multiple thresholds instead of a single threshold for determining whether to begin a replication process. With only a single threshold, a single storage server going up or down repeatedly could trigger flip-flopping between the replication process being in an active state or an inactive state. With the gray area between the low and high watermark thresholds, this flip-flopping between states is prevented by making the availability percentage have to go past the low or high watermark threshold to change states of the replication process. An exemplary application of these techniques will now be discussed, starting with reference to FIG. 1.

FIG. 1 depicts a block diagram of example elements of a cloud environment 100, according to some embodiments. Cloud environment 100 includes a set of components that may be implemented via hardware or a combination of hardware and software. In the illustrated embodiment, cloud environment 100 includes cloud-based service 105 that includes availability zones 110A, 110B, and 110C. Cloud environment 100, in various embodiments, is a cloud infrastructure that includes various components (e.g., hardware, virtualized resources, storage, and network resources) for providing cloud computing services to users. In some embodiments, cloud environment 100 is spread across multiple geographical locations and each location may define a "region" of cloud environment 100. A region may include a set of data centers that can be clustered together. Within a region, there may be one or more availability zones 110.

As used herein, the term "availability zones" refers to two or more cloud areas that are geographically separated and across which data is replicated. Availability zones 110 may be located in the same region or they can be in separate regions. An availability zone 110, in various embodiments, is a logical or physical grouping of components (e.g., computing resources, storage resources, etc.) within a region. In many cases, the components of a given availability zone 110 are isolated from the failures of components in other availability zones 110. For example, availability zone 110A may be a first data center in a certain region, availability zone 110B may be a second data center in the same region, and availability zone 110C may be a third data center in the same region. Availability zone 110A may be isolated such that a failure at the data center of availability zone 110B or at the data center of availability zone 110C does not affect the data center of availability zone 110A. In some cases, availability zones 110A, 110B, and 110C might be the same data center, but correspond to components on separate networks such that one availability zone 110 might not be affected by the other availability zone 110.

In various embodiments, data storage cluster 120 is distributed across two or more availability zones 110 with data replicated between availability zones. Data may be replicated across the availability zones in data storage cluster 120 to provide data redundancy in the data storage cluster. In certain embodiments, availability zones 110 are separated geographically by some distance such that an external failure in one availability zone (e.g., a power failure or natural disaster) does not affect another availability zone and stored data is still available for retrieval. In the context of cloud-based service 105, availability zones 110 may sometimes be referred to as "computer zones". It is to be understood that while the illustrated embodiment of FIG. 1 and various embodiments described herein depict three availability zones, cloud-based service 105 may include any plural number of availability zones 110 (such as two or more availability zones). In certain embodiments, three availability zones are implemented to provide high availability of data in the event of either the failure of one availability zone or the failure of one availability zone and one storage server or machine in another availability zone (e.g., one non correlated storage server or machine).

In certain embodiments, data storage cluster 120 includes storage servers 130, storage servers 140, and storage servers 150 distributed across availability zones 110A, 110B, and 110C, respectively. The number of storage servers 130, 140, or 150 in each availability zone may vary though typically each availability zone includes the same number of storage servers. In the illustrated embodiment, availability zone 110A includes storage servers 130A-n, availability zone 110B includes storage servers 140A-n, and availability zone 110C includes storage servers 150A-n. Thus, as depicted, each availability zone 110 has the same number, n, of storage servers.

Figure 2:
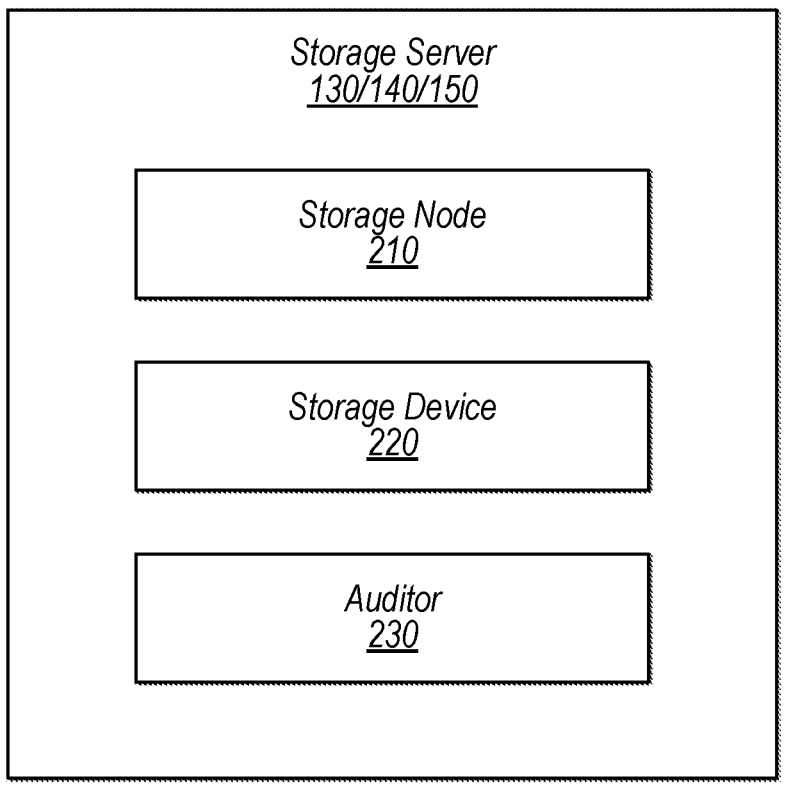
FIG. 2 depicts a block diagram illustrating an example of a storage server, according to some embodiments.

FIG. 2 depicts a block diagram illustrating an example of a storage server, according to some embodiments. As used herein, the term "storage server" refers to a combination of components used to manage and store data in cloud-based service 105. In various embodiments, storage server 130/140/150 includes storage node 210, storage device 220, and auditor 230. In certain embodiments, storage node 210 is a set of software routines executable to implement storage server 130/140/150, which is capable of providing storage functionality in cloud-based service 105. In some embodiments, the hardware used to execute the set of software routines is considered a part of storage node 210. Storage node 210 may receive requests to read and write data on behalf of cloud-based service 105 and, in various instances, specifically on behalf of its storage server 130/140/150. As an example, storage node 210 may receive a request to write or read data stored on storage device 220. In certain embodiments, storage device 220 is a data storage element where the data is maintained in storage server 130/140/150. In various embodiments, storage device 220 is an elastic block storage (EBS) element. Other embodiments of a data storage element may also be contemplated such as, but not limited to, an object storage element or a non-volatile memory storage element.

In the illustrated embodiment, storage server 130/140/150 includes auditor 230. As used herein, the term "auditor" refers to a component that assesses the status of storage servers 130/140/150 across availability zones 110 and handles the replication of data across availability zones. In certain embodiments, auditor 230 communicates with cluster manager 170, as described in FIG. 3 below, to assess or determine the status of storage servers 130/140/150. In various embodiments, auditor 230 implements data replication practices such that data stored by one storage server 130/140/150 is stored by at least one other storage server 130/140/150. For example, the data stored by storage server 130A may be stored by storage server 140A. Auditor 230 may identify and handle the locations for replication of data across storage servers 130/140/150. In some embodiments, portions of data are stored on different storage servers 130/140/150 such that a complete copy is not maintained by a single storage server. In various embodiments described herein, stored data is replicated across availability zones 110 in the event of a failure of all or a part of one availability zone 110. Thus, if all or a part of one availability zone 110 becomes unavailable due to the failure, the data is still accessible through another availability zone 110; or if a certain portion of cloud-based service 105 on an availability zone 110 becomes unavailable, the data can be accessed through another portion of cloud-based service 105.

In certain embodiments, auditor 230 is located on each storage server 130/140/150 in data storage cluster 120. While auditor 230 is available on each of the storage servers 130/140/150 across availability zones 110, only one auditor on one storage server in one availability is typically active at one time. The active auditor may assess the status of storage servers 130/140/150 across availability zones 110 and manage the replication of data across the availability zones. In the event the active auditor is in a storage server that goes down (fails), the functions for the active auditor automatically switch to another auditor on an available storage server. In some embodiments, the new active auditor is determined based on communication with cluster manager 170. For example, the new active auditor may be selected based on an election managed by cluster manager 170, as described herein.

Turning back to FIG. 1, in the illustrated embodiment, cloud environment 100 includes database node 160. As used herein, the term "database node" refers to a component that handles storage, retrieval, and manipulation of data in cloud environment 100. For instance, database node 160 may interface with storage servers 130/140/150 to handle storage, retrieval, and manipulation of data in data storage cluster 120. In various embodiments, database node 160 provides requests to storage servers 130/140/150 for the reading and writing of data on behalf of cloud-based service 105. In some embodiments, database node 160 instantiates storage servers 130/140/150 in data storage cluster 120.

Database node 160 may be, for example, a component that is implemented by an application running on a server in cloud environment 100. For instance, database node 160 may be a software routine executable by an application running on a server that is collocated in cloud environment 100 or any of the availability zones 110. In various embodiments, database node 160 is instantiated in cloud environment 100 by cluster manager 170. In some embodiments, database node 160 is implemented differently than shown in FIG. 1. For instance, database node 160 may be instantiated on multiple servers within availability zones 110 to provide redundancy within the availability zones. In such embodiments, a primary instance of a database node is running on one server in the availability zone with duplicates of the database node instantiated on additional servers as backup. Thus, in the case of failure of the primary instance of the database node, a backup (secondary) instance of the database node may be activated to replace the failed primary instance.

In various embodiments, storage servers 130/140/150, database node 160, and cluster manager 170 in availability zones 110 implement a database (e.g., a distributed database storage system) that may be used by other applications for the storage and query of data. In the illustrated embodiment, cloud environment 100 includes cluster manager 170. As used herein, the term "cluster manager" refers to a centralized management or orchestration service that facilitates the deployment of cloud-based service 105 using the resources of availability zones 110. In various embodiments, cluster manager 170 includes a set of software routines executable to provide the management or orchestration service. Kubernetes™ and Apache Zookeeper™ are examples of cluster managers. Cluster manager 170 may deploy containerized applications that implement cloud-based service 105. In some embodiments, cluster manager 170 is associated with a region and thus is responsible for facilitating deployments within the availability zones 110 of that region. As shown in FIG. 1, for example, cluster manager 170 interfaces with availability zone 110A, availability zone 110B, and availability zone 110C and thus can facilitate the deployment of storage servers 130/140/150 within those availability zones 110. While cluster manager 170 is depicted separately from availability zones 110, in various embodiments, cluster manager 170 is instantiated within an availability zone 110 (e.g., availability zone 110A). Though, cluster manager 170 might be instantiated in one of the availability zones 110, cluster manager 170 may still facilitate deployments within other availability zones 110 (e.g., availability zone 110B). In some embodiments, however, cluster manager 170 may facilitate deployments within only its own availability zone 110. Accordingly, multiple cluster managers 170 may be instantiated in order to manage deployments for each availability zone 110 and to allow for cloud-based service 105 to be distributed across those availability zones 110.

In various embodiments, cluster manager 170 maintains resource information that describes the resources (e.g., processors, storage servers, storage devices, auditors, network ports, virtual machines, etc.) of availability zones 110 that are accessible to cluster manager 170 for deploying cloud-based service 105. Cluster manager 170 may receive deployment requests (e.g., from an admin of an organization) to deploy cloud-based service 105. In various embodiments, a deployment request includes a specification describing what type of cloud-based service 105 to deploy and how it should be deployed (e.g., a storage service or cluster should be deployed across at least two availability zones 110). Based on receiving a deployment request, cluster manager 170 may consider the requirements of the specification and the availability zone resources available to it for meeting those requirements. Cluster manager 170 may then attempt to deploy the requested cloud-based service 105 using resources of availability zones 110. In various embodiments, cluster manager 170 stores location information that describes the locations where cluster manager 170 has instantiated components of cloud-based service 105. As an example, the information may indicate that storage servers 130A-n of the illustrated cloud-based service 105 are instantiated on resources of availability zone 110A.

In certain embodiments, cluster manager 170 maintains information for various elements of cloud-based service 105, such as the health of storage servers 130/140/150 and database node 160, as well as metadata used by the various nodes to determine how to handle requests from various entities for data. In certain embodiments, metadata is stored in metadata store 180, which is instantiated in cluster manager 170. Metadata store 180, in various embodiments, is a repository that stores metadata, which can pertain to the operation of cloud-based service 105. The metadata may specify, for example, the locations where particular data has been stored in cloud-based service 105. As an example, the metadata may specify that records for a particular key range are stored at storage servers 130A and 130B.

In certain embodiments, metadata in metadata store 180 specifies whether storage servers 130/140/150 are running or not running in cloud-based service 105. For instance, as described above, cluster manager 170 may monitor whether storage servers 130/140/150 have heartbeats, for example, by querying the storage servers at regular intervals. Metadata for storage servers with a heartbeat is maintained in metadata store 180 while the metadata for any storage servers without a heartbeat is deleted from the metadata store.

Cluster manager 170 and metadata store 180 may be accessible to various components of cloud environment 100, including database node 160 along with storage node 210 and auditor 230 (shown in FIG. 2). In some embodiments, cloud environment 100 is implemented differently than shown in FIG. 1. For example, cluster manager 170 and metadata store 180 may be implemented using nodes within availability zones 110A, 110B, and 110C. As another example, metadata store 180 might be distributed across availability zones 110A, 110B, and 110C such that metadata is available locally to a specific availability zone 110.

In various embodiments, cloud-based service 105 is a service or system that provides a set of functionalities and is deployable on the cloud infrastructure of cloud environment 100. Cloud-based service 105 may include, for example, a distributed storage service, a database management system, an e-mail service, a web application server, etc. In various embodiments, cloud-based service 105 is implemented by executing a set of program instructions. As such, cluster manager 170 may deploy cloud-based service 105 to one or more availability zones 110 by causing its corresponding program instructions to be executed on the resources of those availability zones 110. In the illustrated embodiment, cloud-based service 105 is a storage service having multiple storage servers 130/140/150 that have been instantiated across availability zones 110A, 110B, and 110C. In some cases, storage servers 130/140/150 of cloud-based service 105 may form one or more clusters (e.g., data storage cluster 120), as described herein.

Figure 3:
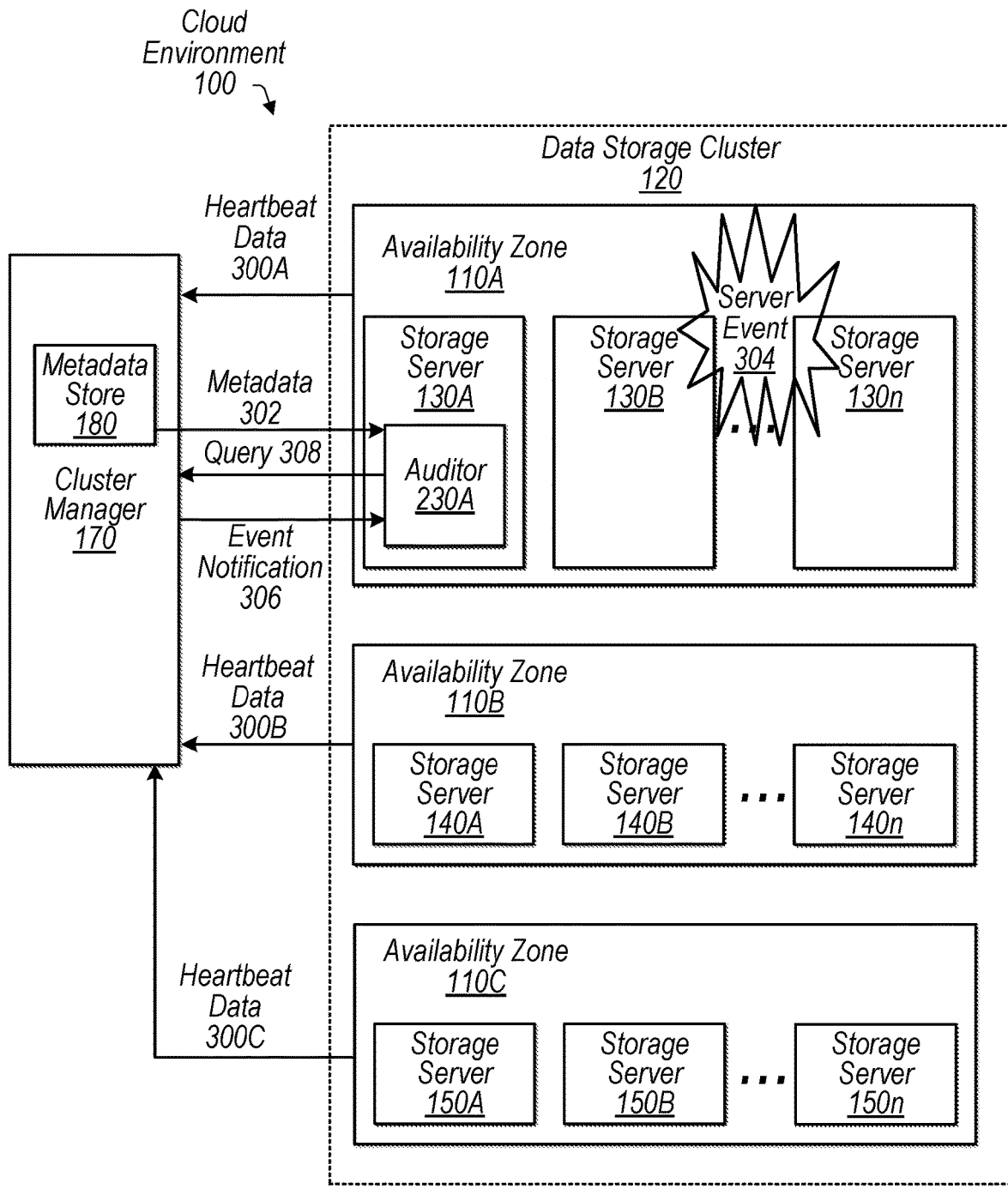
FIG. 3 depicts a block diagram of example elements of interaction between a cluster manager and an auditor in a data storage cluster, according to some embodiments.

FIG. 3 depicts a block diagram of example elements of interaction between cluster manager 170 and auditor 230A in data storage cluster 120, according to some embodiments. In the illustrated embodiment, auditor 230A is the active auditor in data storage cluster 120 and is located on storage server 130A. In certain embodiments, auditor 230A is determined to be the active auditor based on an election implemented by cluster manager 170. For instance, when storage servers 130/140/150 start up, each auditor in each storage server also starts up. During the startup, cluster manager 170 assesses operational properties of storage servers 130/140/150 and auditors 230. The operational properties may be, for example, process time, response time, communication time, etc. Based on the assessed operational properties, an auditor with the best operational properties may be chosen ("elected") as the active auditor. When the active auditor goes down (e.g., because of a storage server failure), a new election may be implemented to determine the replacement active auditor.

In various embodiments, auditor 230A tracks storage servers 130/140/150 across availability zones 110A, 110B, and 110C based on communication with cluster manager 170 to assess the health status of the storage servers. For instance, as shown in FIG. 3, cluster manager 170 receives heartbeat data 300A, 300B, and 300C from availability zones 110A, 110B, and 110C, respectively. Heartbeat data 300A, 300B, and 300C includes heartbeat data for storage servers 130A-n, 140A-n, and 150A-n, respectively. Based on the received heartbeat data, cluster manager 170 may delete metadata in metadata store 180 for any storage servers for which a heartbeat is not received as the lack of a heartbeat indicates that a storage server is not operating (e.g., is unavailable or down). Metadata is maintained for storage servers with heartbeats as a heartbeat indicates that a storage server is operating (e.g., is available or up).

In certain embodiments, auditor 230A determines which storage servers 130/140/150 are available (up) and which storage servers are unavailable (down) across the availability zones based on metadata 302 received from metadata store 180 in cluster manager 170. For instance, auditor 230A may determine whether metadata for individual storage servers exists or does not exist in metadata received from cluster manager 170. When the metadata for a specified storage server exists, auditor 230A may determine that the specified storage server is available and running. To the contrary, when the metadata for a specified storage server does not exist, auditor 230A may determine that the specified storage server is unavailable and not running if metadata for the specified storage server previously existed.

In various embodiments, auditor 230A queries cluster manager 170 for metadata 302 in response to server event 304 in data storage cluster 120. Server event 304 may be, for example, a storage server 130/140/150 becoming available/unavailable (going up/down). In the illustrated embodiment, server event 304 is a server event in availability zone 110A. Server event 304 may, however, occur any availability zone and include any number of availability zones. In an example embodiment described herein, server event 304 includes one or more of storage servers 130B-130n in availability zone 110A becoming unavailable (going down). Examples of events that may cause storage servers to go down include, but are not limited to, CPU overheating, power failure, or disk corruptions. With server event 304 happening, heartbeat data 300A may indicate to cluster manager 170 that one or more of storage servers 130B-130n in availability zone 110A have gone down and metadata for the down storage servers is deleted from metadata store 180.

In certain embodiments, cluster manager 170 provides event notification 306 (or another indication) to auditor 230A that a status of at least one storage server in an availability zone (e.g., at least one storage server 130B-130n in availability zone 110A) has changed. For example, cluster manager 170 may provide event notification 306 to auditor 230A when at least one storage server becomes unavailable (goes down) or at least one storage server becomes available (starts up). In some embodiments, event notification 306 may be provided in response to another incident affecting the storage servers in data storage cluster 120 that is detected by cluster manager 170. For example, cluster manager 170 may provide event notification 306 in response to detecting router failures, switch firmware upgrades, or other external events that may cause storage server failures in data storage cluster 120. As another example, cluster manager 170 may provide event notification 306 in response to detecting an external disaster event (such as a strong storm or wildfire) that may affect one or more availability zones 110 in data storage cluster 120.

In certain embodiments, auditor 230A sends query 308 to cluster manager 170 in response to receiving event notification 306. In some embodiments, query 308 includes a request to receive metadata 302 for all storage servers in data storage cluster 120 (e.g., storage servers 130A-n, storage servers 140A-n, and storage servers 150A-n). In other embodiments, query 308 includes a request to receive metadata 302 for storage servers in only the affected availability zone (e.g., storage servers 130A-n in availability zone 110A in the illustrated embodiment). For instance, event notification 306 may include some indication of the availability zone having server event 304 (e.g., an indication that availability zone 110A is affected by the server event). In other contemplated embodiments, auditor 230A may send query 308 to cluster manager 170 at regular intervals and the auditor may make a determination of the status of storage servers 130/140/150 at the regular intervals.

In response to query 308, cluster manager 170 provides the requested metadata 302 from metadata store 180 to auditor 230A. Auditor 230A may then determine the health of the storage servers in the affected availability zone based on the received metadata. For instance, in the illustrated embodiment of FIG. 3, auditor 230A determines the health of storage servers 130A-n in availability zone 110A.

Figure 4:
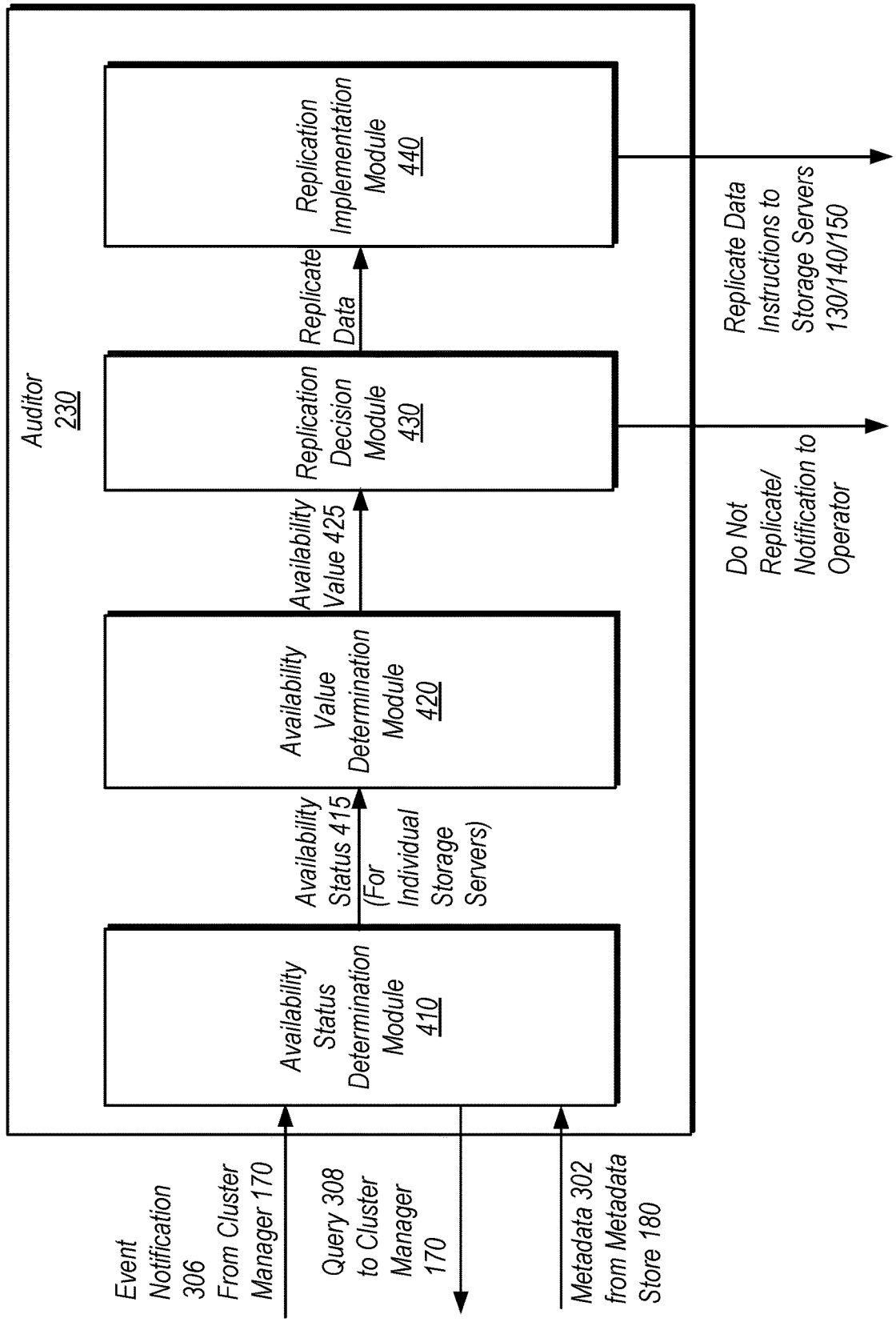
FIG. 4 depicts a block diagram of example elements of an auditor used to determine the health of storage servers in response to an event notification, according to some embodiments.

FIG. 4 depicts a block diagram of example elements of auditor 230 used to determine the health of storage servers in response to an event notification, according to some embodiments. In various embodiments, auditor 230 includes availability status determination module, availability value determination module 420, replication decision module 430, and replication implementation module 440. As described herein, auditor 230 determines whether to replicate or not replicate data from an affected availability zone in response to an event (e.g., a server event). It should be understood that while the present description describes an "affected availability zone", this term should be considered to be inclusive of more than one affected availability zone. For example, in some instances, more than one availability zone may be affected by a server event. Additionally, some embodiments may be contemplated where the status of two or more availability zones may be desired in response to an event affecting one availability zone. In such embodiments, although only one availability zone is affected, the status of storage servers in multiple availability zones is determined by auditor 230.

In certain embodiments, availability status determination module 410 determines availability status 415 for the storage servers in the affected availability zone (e.g., storage servers 130A-n in availability zone 110A) in response to receiving event notification 306 from cluster manager 170. As shown in the illustrated embodiment, availability status determination module 410 determines availability status 415 based on metadata 302 received from metadata store 180 in response to query 308. Availability status 415 includes the availability status of individual storage servers in the affected availability zone (with the possibility of assessing status of additional storage servers in other availability zones as described above). For instance, availability status determination module 410 may determine availability status 415 for individual storage servers in the affected availability zone based on the existence or nonexistence of metadata for each individual storage server in the received metadata 302, as described above. Thus, availability status determination module 410 determines availability status 415 of each individual storage server in the affected availability zone(s) (e.g., whether each individual storage server is available or unavailable).

It should be noted that other embodiments may be contemplated when availability status determination module 410 determines that only a single storage server in the affected availability zone is unavailable. When only the single storage server is determined to be unavailable, it may be likely that the single storage server is only temporarily down. Thus, a determination may be made to delay replication of data from the single storage server to another availability zone for at least some predetermined time period before allowing replication to continue. This delay may allow the storage server time to possibly become available again. If another storage server goes down during the predetermined time period, however, the process of determining the availability value and determining whether to replicate data based on the availability value (as described below) may continue to avoid wasting further time for a decision to be made about replicating data.

In the illustrated embodiment, availability status 415 is provided to availability value determination module 420. In certain embodiments, availability value determination module 420 determines availability value 425 for the storage servers in the affected availability zone (e.g., storage servers 130A-n in availability zone 110A) based on availability status 415 of each individual storage server in the affected availability zone. As used herein, the term "availability value" refers to a parameter assessed for one or more availability zones based on the health of the storage servers within the one or more availability zones. In various embodiments, an availability value may be referred to as a health parameter for the storage servers in the affected availability zone(s).

In certain embodiments, availability value determination module 420 determines availability value 425 as a percentage of a total number of storage servers in the affected availability zone that are available (running). For instance, for the illustrated embodiment of FIG. 3, availability value 425 may be a percentage of storage servers 130A-n that are available out of n total storage servers in availability zone 110A. As one example, if there are 30 total storage servers 130 in availability zone 110A and availability status determination module 410 determines that 5 storage servers are unavailable (and thus 25 storage servers are available as shown by availability status 415), availability value determination module 420 may determine availability value 425 is 83.3%.

Figure 5:
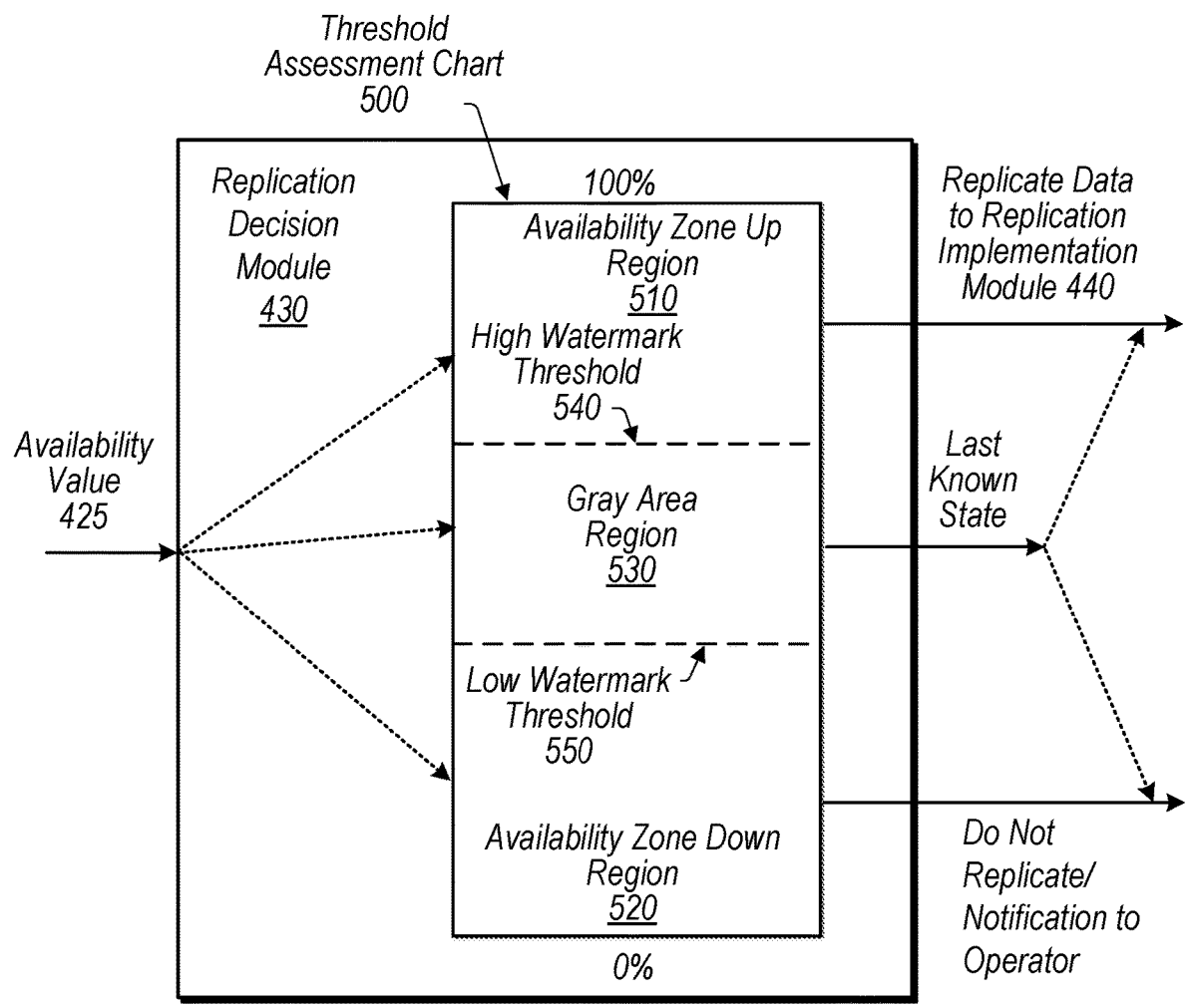
FIG. 5 depicts a block diagram of example elements of a replication decision module used to assess an availability value against one or more thresholds, according to some embodiments.

In certain embodiments, replication decision module 430 determines whether to replicate data to other availability zones using availability value 425 received from availability value determination module 420. FIG. 5 depicts a block diagram of example elements of replication decision module 430 used to assess availability value 425 against one or more thresholds, according to some embodiments. In various embodiments, replication decision module 430 implements threshold assessment chart 500 to assess availability value 425 against multiple thresholds.

In certain embodiments, chart 500 includes three regions separated by two thresholds between 0% (zero available storage servers) and 100% (all storage servers available), as shown in FIG. 5. In the illustrated embodiment, chart 500 includes availability zone up region 510, availability zone down region 520, and gray area region 530 with the regions separated by high watermark threshold 540 and low watermark threshold 550. In certain embodiments, high watermark threshold 540 and low watermark threshold 550 are predetermined values. As one example, high watermark threshold 540 may be a percentage value between about 65% and about 75% (e.g., 70%) while low watermark threshold 550 may be a percentage between about 50% and about 60% (e.g., 55%). Availability zone up region 510 then occupies the area of chart 500 above high watermark threshold 540 while availability zone down region 520 occupies the area below low watermark threshold 550. Gray area region 530 is then the region between high watermark threshold 540 and low watermark threshold 550. As described herein, determining availability value 425 as a percentage allows the availability value to be assessed versus high watermark threshold 540 and low watermark threshold 550 agnostically with respect to a capacity of an availability zone. For example, high watermark threshold 540 and low watermark threshold 550 are percentage thresholds that operate for any number of total storage servers in an availability zone.

In certain embodiments, replication decision module 430 determines whether to replicate data or not replicate data to other availability zones based on where availability value 425 falls in chart 500. For instance, when availability value 425 falls in availability zone up region 510, replication decision module 430 determines to replicate data and provides the determination to replication implementation module 440 (shown in FIG. 4) for implementation of the replication process. Availability zone up region 510 represents that the affected availability zone has a high enough percentage of storage servers running (as set by high watermark threshold 540) such that the affected availability zone is considered to be "up" and running. As the number of unavailable storage servers is relatively small when availability value 425 falls in availability zone up region 510, data may be replicated to other availability zones without significant cost or usage of bandwidth and resources in data storage cluster 120.

When availability value 425 falls in availability zone down region 520, replication decision module 430 determines to not replicate data. Availability zone down region 520 represents that the affected availability zone has a low percentage of storage servers running (as set by low watermark threshold 550) such that the affected availability zone is considered to be "down" and unavailable. Thus, when availability value 425 falls in availability zone down region 520, it may be an indication that there is a significant problem causing failure in the affected availability zone. As described herein, the failure may be temporary (such as a power failure, disk corruptions, switch failures, or router failures) or the failure may be permanent (such as caused by a natural disaster).

Determining to not replicate data when availability value 425 falls in availability zone down region 520 may prevent unwanted data transfer in the event the failure in the availability zone is a temporary failure. In availability zone down region 520, the number of storage servers that are unavailable is high and thus, the amount of data to be replicated is large (e.g., larger than when in availability zone up region 510 or gray area region 530). As described herein, replication of such large amounts of data may be unwanted as the transfer of the data may occupy resources and take up bandwidth in data storage cluster 120, thereby reducing the performance of the data storage cluster.

If, however, the failure in the availability zone is a permanent failure, data replication needs to proceed at some point in time after the event. Thus, in some embodiments, as shown in FIG. 5, replication decision module 430 provides a notification of the determination to not replicate the data to an operator of data storage cluster 120 when availability value 425 falls in availability zone down region 520. As described above, the operator may determine to proceed with a manual investigation or initiate automatic investigation tools to determine causes of the failure and whether the failure is temporary or permanent. If the failure is determined by the operator to be permanent, the operator may initiate data replication for the affected availability zone.

In some embodiments, replication decision module 430 may set a predetermined time period that needs to be exceeded before the replication decision module provides a notification of the determination to not replicate the data to the operator. For example, a predetermined time period may be set that differentiates between a temporary failure event and a permanent failure event (such as 30 minutes). Once this predetermined time period elapses, replication decision module 430 provides the notification of the determination to not replicate the data to the operator, who may then take action. In some embodiments, the replication of data may be automatically initiated by replication decision module 430 availability value 425 falls in availability zone down region 520. For instance, once the predetermined time period elapses, replication decision module 430 may provide an indication to replicate data to replication implementation module 440, shown in FIG. 4, which then proceeds with implementing the replication process. In this instance, replication decision module 430 initiates the replication process following the predetermined time period automatically without the need for operator or human interaction.

As shown in FIG. 5, gray area region 530 exists between high watermark threshold 540 and low watermark threshold 550. In certain embodiments, when availability value 425 falls in gray area region 530, replication decision module 430 determines whether to replicate data or not replicate data based on the last known state of the affected availability zone. For example, replication decision module 430 may determine to replicate data when the last known state for the affected availability zone was an availability value that fell in availability zone up region 510. To the contrary, replication decision module 430 may determine to not replicate data when the last known state for the affected availability zone was an availability value that fell in availability zone down region 520.

Having gray area region 530 between availability zone up region 510 and availability zone down region 520 prevents flip-flopping between replicating and not replicating data based on a status of a single storage server or a small number of storage servers changing. For instance, for replication decision module 430 to switch from not replicating data based on an availability value falling in availability zone down region 520 to replicating data, the availability value has to go above high watermark threshold 540 instead of just low watermark threshold 550 to change the replication state. Similarly, for replication decision module 430 to switch from replicating data based on an availability value falling in availability zone up region 510 to replicating data, the availability value has to go below low watermark threshold 550.

Turning back to FIG. 4, the outputs of replication decision module 430 are shown (e.g., "replicate data" or "do not replicate data"). In various embodiments, the decision to replicate data is provided to replication implementation module 440. In response to receiving the replicate data decision, replication implementation module 440 may determine instructions for replication of data. The instructions may include, for example, information on which storage servers in which availability zone are to have data replicated and where that data is to be replicated (e.g., which storage servers in other availability zones). The instructions may then be sent to storage servers 130/140/150 (shown in FIG. 1) for implementation of the data replication process. Storage servers 130/140/150 may replicate data according to replication methods known in the art.

Example Methods

Figure 6:
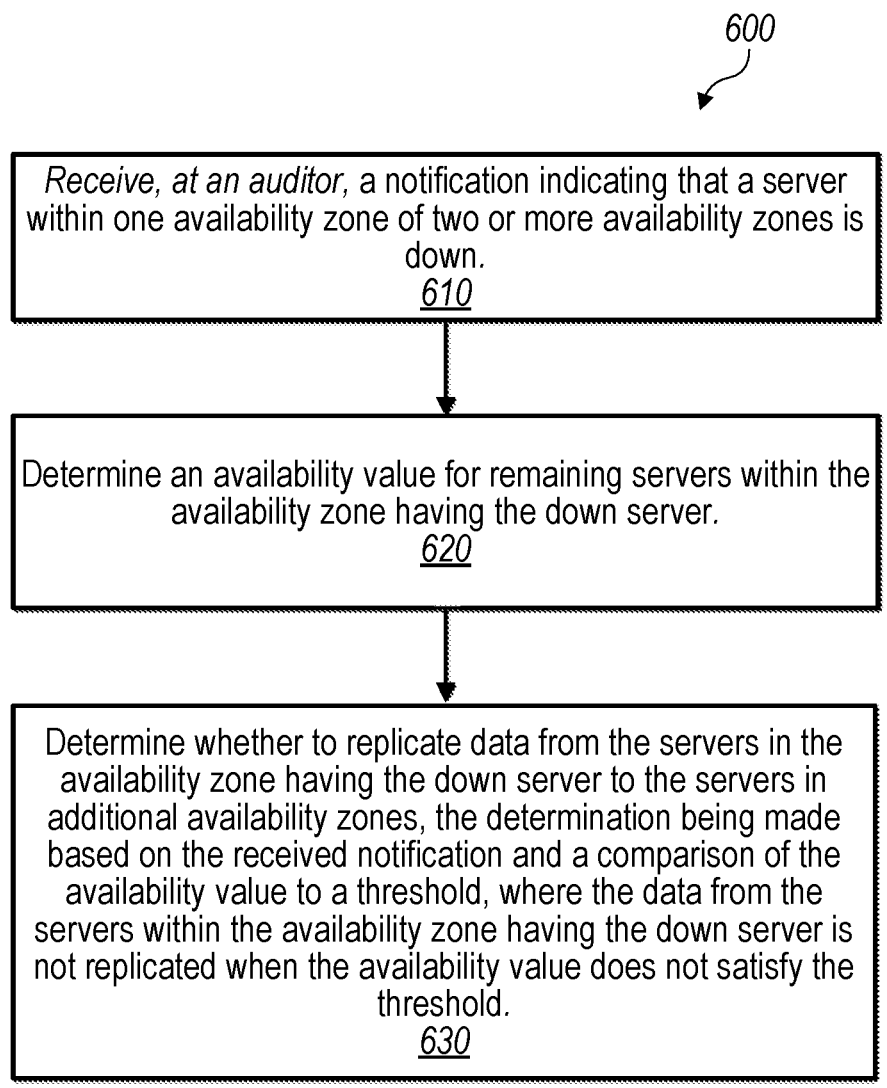
FIG. 6 is a flow diagram illustrating an example method for determining whether to replicate data in a cloud-based service, according to some embodiments.

FIG. 6 is a flow diagram illustrating an example method for determining whether to replicate data in a cloud-based service, according to some embodiments. Method 600, shown in FIG. 6, may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Method 600 may be performed by executing a set of program instructions stored on a non-transitory computer-readable medium.

At 610, in the illustrated embodiment, an auditor receives a notification indicating that a server within one availability zone of two or more availability zones is down. In some embodiments, the auditor receives metadata for the servers from a cluster manager associated with the data storage cluster. In some embodiments, the auditor determines an availability zone that corresponds to a server in the data storage cluster based on the received metadata.

At 620, in the illustrated embodiment, the auditor determines an availability value for remaining servers within the availability zone having the down server. In some embodiments, the auditor assesses a status of the servers in the data storage cluster to determine whether a server is available or a server is down. In some embodiments, the availability value is a percentage of the servers in in the availability zone having the down server that are assessed as being available.

At 630, in the illustrated embodiment, the auditor determines whether to replicate data from the servers in the availability zone having the down server to the servers in additional availability zones, the determination being made based on the received notification and a comparison of the availability value to a threshold, where the data from the servers within the availability zone having the down server is not replicated when the availability value does not satisfy the threshold. In some embodiments, the threshold is a predetermined availability value that indicates an availability zone is down when the availability value is below the predetermined availability value.

In some embodiments, the auditor compares the availability value to an additional threshold where the data from the servers within the availability zone having the down server is replicated when the availability value satisfies the additional threshold. In some embodiments, the auditor determines whether to replicate data from the servers in the availability zone having the down server to the servers in additional availability zones based on a last known state of the availability zone when the availability value satisfies the threshold but does not satisfy the additional threshold.

In some embodiments, the auditor determines that the availability value has not satisfied the threshold for a predetermined time period and provides an indication to replicate the data from the servers in the availability zone having the down server to the servers in additional availability zones in response to the availability value not satisfying the threshold for the predetermined time period.

Figure 7:
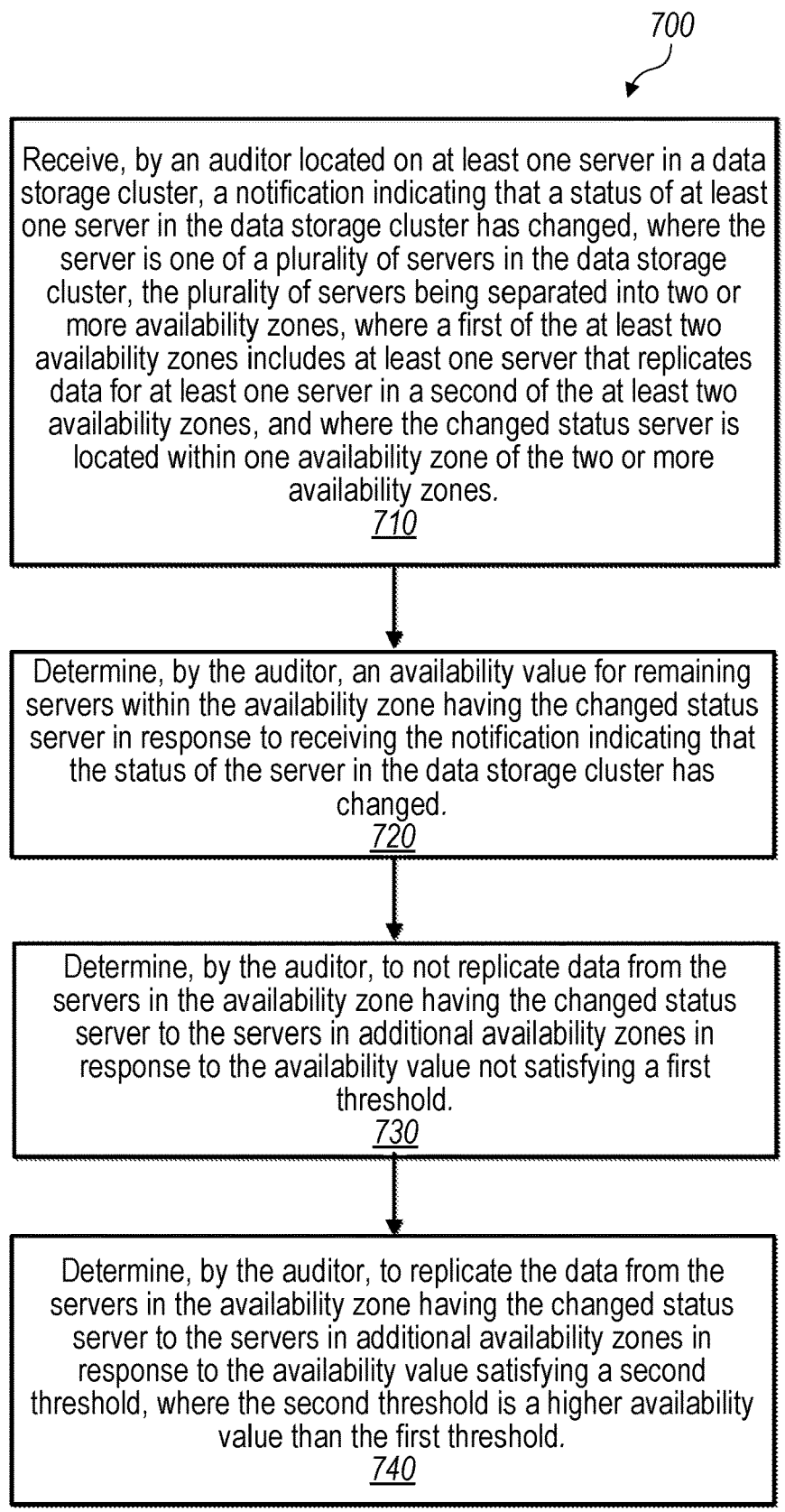
FIG. 7 is a flow diagram illustrating another example method for determining whether to replicate data in a cloud-based service, according to some embodiments.

FIG. 7 is a flow diagram illustrating another example method for determining whether to replicate data in a cloud-based service, according to some embodiments. Method 700, shown in FIG. 7, may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Method 700 may be performed by executing a set of program instructions stored on a non-transitory computer-readable medium.

At 710, in the illustrated embodiment, an auditor located on at least one server in a data storage cluster receives a notification indicating that a status of at least one server in the data storage cluster has changed where the server is one of a plurality of servers in the data storage cluster, the plurality of servers being separated into two or more availability zones, where a first of the at least two availability zones includes at least one server that replicates data for at least one server in a second of the at least two availability zones and where the changed status server is located within one availability zone of the two or more availability zones.

At 720, in the illustrated embodiment, the auditor determines an availability value for remaining servers within the availability zone having the changed status server in response to receiving the notification indicating that the status of the server in the data storage cluster has changed.

At 730, in the illustrated embodiment, the auditor determines to not replicate data from the servers in the availability zone having the changed status server to the servers in additional availability zones in response to the availability value not satisfying a first threshold. In some embodiments, the first threshold is a predetermined availability value for an availability zone that indicates the availability zone is down when the availability value is below the predetermined availability value.

At 740, in the illustrated embodiment, the auditor determines to replicate the data from the servers in the availability zone having the changed status server to the servers in additional availability zones in response to the availability value satisfying a second threshold where the second threshold is a higher availability value than the first threshold. In some embodiments, the second threshold is a predetermined availability value for an availability zone that indicates the availability zone is up when the availability value is above the predetermined availability value.

In some embodiments, the auditor determines that the availability value satisfies the first threshold but does not satisfy the second threshold, assesses a last known state of the availability zone having the changed status server, and determines whether to replicate the data from the servers in the availability zone having the changed status server to the servers in additional availability zones based on the assessed last known state.

In some embodiments, the auditor assesses, in response to the availability value not satisfying the first threshold, whether the availability value has failed to satisfy the first threshold for a predetermined time period and determines to replicate the data from the servers in the availability zone having the changed status server to the servers in additional availability zones in response to the availability value failing to satisfy the first threshold for the predetermined time period. In some embodiments, the auditor provides an indication to an operator to replicate the data from the servers in the availability zone having the changed status server to the servers in additional availability zones.

Exemplary Multi-Tenant Database System

Figure 8:
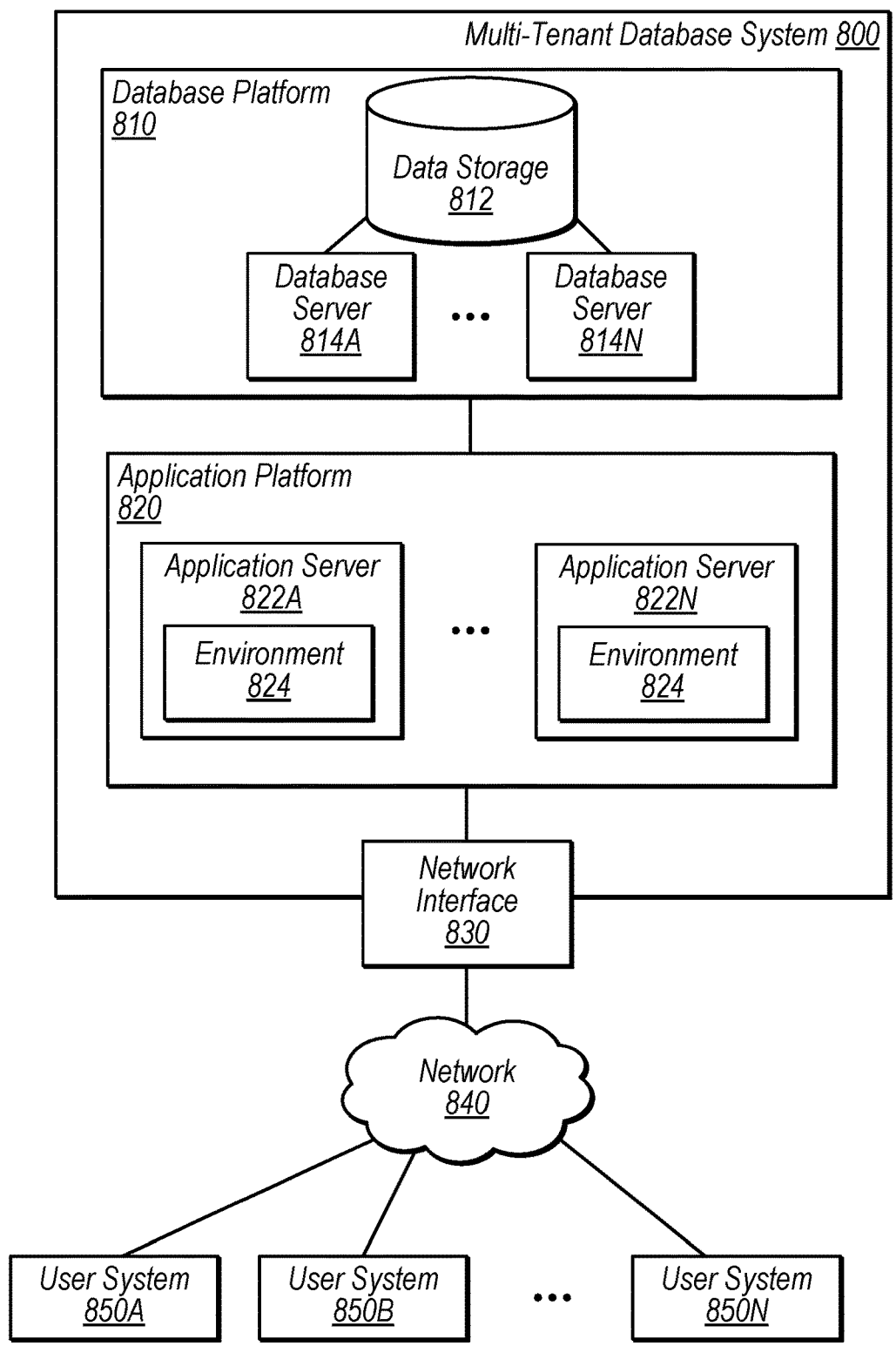
FIG. 8 depicts an exemplary multi-tenant database system (MTS) in which various techniques of the present disclosure can be implemented.

Turning now to FIG. 8, an exemplary multi-tenant database system (MTS) 800 in which various techniques of the present disclosure can be implemented is shown—e.g., cloud environment 100 may be MTS 800. In FIG. 8, MTS 800 includes a database platform 810, an application platform 820, and a network interface 830 connected to a network 840. Also as shown, database platform 810 includes a data storage 812 and a set of database servers 814A-N that interact with data storage 812, and application platform 820 includes a set of application servers 822A-N having respective environments 824. In the illustrated embodiment, MTS 800 is connected to various user systems 850A-N through network 840. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 800, in various embodiments, is a set of computer systems that together provide various services to users (alternatively referred to as "tenants") that interact with MTS 800. In some embodiments, MTS 800 implements a customer relationship management (CRM) system that provides mechanism for tenants (e.g., companies, government bodies, etc.) to manage their relationships and interactions with customers and potential customers. For example, MTS 800 might enable tenants to store customer contact information (e.g., a customer's website, email address, telephone number, and social media data), identify sales opportunities, record service issues, and manage marketing campaigns. Furthermore, MTS 800 may enable those tenants to identify how customers have been communicated with, what the customers have bought, when the customers last purchased items, and what the customers paid. To provide the services of a CRM system and/or other services, as shown, MTS 800 includes a database platform 810 and an application platform 820.

Database platform 810, in various embodiments, is a combination of hardware elements and software routines that implement database services for storing and managing data of MTS 800, including tenant data. As shown, database platform 810 includes data storage 812. Data storage 812, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 812 is used to implement a database (e.g., cloud-based service 105) comprising a collection of information that is organized in a way that allows for access, storage, and manipulation of the information. Data storage 812 may implement a single database, a distributed database, a collection of distributed databases, a database with redundant online or offline backups or other redundancies, etc. As part of implementing the database, data storage 812 may store files that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 800 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that one tenant does not have access to another tenant's data, unless such data is expressly shared.

In some embodiments, the data stored at data storage 812 is organized as part of a log-structured merge-tree (LSM tree). An LSM tree normally includes two high-level components: an in-memory buffer and a persistent storage. In operation, a database server 814 may initially write database records into a local in-memory buffer before later flushing those records to the persistent storage (e.g., data storage 812). As part of flushing database records, the database server 814 may write the database records into new files that are included in a "top" level of the LSM tree. Over time, the database records may be rewritten by database servers 814 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 812.

When a database server 814 wishes to access a database record for a particular key, the database server 814 may traverse the different levels of the LSM tree for files that potentially include a database record for that particular key. If the database server 814 determines that a file may include a relevant database record, the database server 814 may fetch the file from data storage 812 into a memory of the database server 814. The database server 814 may then check the fetched file for a database record having the particular key. In various embodiments, database records are immutable once written to data storage 812. Accordingly, if the database server 814 wishes to modify the value of a row of a table (which may be identified from the accessed database record), the database server 814 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 814, in various embodiments, are hardware elements, software routines, or a combination thereof capable of providing database services, such as data storage, data retrieval, and/or data manipulation. A database server 814 may correspond to database node 160. Such database services may be provided by database servers 814 to components (e.g., application servers 822) within MTS 800 and to components external to MTS 800. As an example, a database server 814 may receive a database transaction request from an application server 822 that is requesting data to be written to or read from data storage 812. The database transaction request may specify an SQL SELECT command to select one or more rows from one or more database tables. The contents of a row may be defined in a database record and thus database server 814 may locate and return one or more database records that correspond to the selected one or more table rows. In various cases, the database transaction request may instruct database server 814 to write one or more database records for the LSM tree—database servers 814 maintain the LSM tree implemented on database platform 810. In some embodiments, database servers 814 implement a relational database management system (RDMS) or object oriented database management system (OODBMS) that facilitates storage and retrieval of information against data storage 812. In various cases, database servers 814 may communicate with each other to facilitate the processing of transactions. For example, database server 814A may communicate with database server 814N to determine if database server 814N has written a database record into its in-memory buffer for a particular key.

Application platform 820, in various embodiments, is a combination of hardware elements and software routines that implement and execute CRM software applications as well as provide related data, code, forms, web pages and other information to and from user systems 850 and store related data, objects, web page content, and other tenant information via database platform 810. In order to facilitate these services, in various embodiments, application platform 820 communicates with database platform 810 to store, access, and manipulate data. In some instances, application platform 820 may communicate with database platform 810 via different network connections. For example, one application server 822 may be coupled via a local area network and another application server 822 may be coupled via a direct network link. Transfer Control Protocol and Internet Protocol (TCP/IP) are exemplary protocols for communicating between application platform 820 and database platform 810, however, it will be apparent to those skilled in the art that other transport protocols may be used depending on the network interconnect used.

Application servers 822, in various embodiments, are hardware elements, software routines, or a combination thereof capable of providing services of application platform 820, including processing requests received from tenants of MTS 800. Application servers 822, in various embodiments, can spawn environments 824 that are usable for various purposes, such as providing functionality for developers to develop, execute, and manage applications (e.g., business logic). Data may be transferred into an environment 824 from another environment 824 and/or from database platform 810. In some cases, environments 824 cannot access data from other environments 824 unless such data is expressly shared. In some embodiments, multiple environments 824 can be associated with a single tenant.

Application platform 820 may provide user systems 850 access to multiple, different hosted (standard and/or custom) applications, including a CRM application and/or applications developed by tenants. In various embodiments, application platform 820 may manage creation of the applications, testing of the applications, storage of the applications into database objects at data storage 812, execution of the applications in an environment 824 (e.g., a virtual machine of a process space), or any combination thereof. In some embodiments, application platform 820 may add and remove application servers 822 from a server pool at any time for any reason, there may be no server affinity for a user and/or organization to a specific application server 822. In some embodiments, an interface system (not shown) implementing a load balancing function (e.g., an F5 Big-IP load balancer) is located between the application servers 822 and the user systems 850 and is configured to distribute requests to the application servers 822. In some embodiments, the load balancer uses a least connections algorithm to route user requests to the application servers 822. Other examples of load balancing algorithms, such as are round robin and observed response time, also can be used. For example, in certain embodiments, three consecutive requests from the same user could hit three different servers 822, and three requests from different users could hit the same server 822.

In some embodiments, MTS 800 provides security mechanisms, such as encryption, to keep each tenant's data separate unless the data is shared. If more than one server 814 or 822 is used, they may be located in close proximity to one another (e.g., in a server farm located in a single building or campus), or they may be distributed at locations remote from one another (e.g., one or more servers 814 located in city A and one or more servers 822 located in city B). Accordingly, MTS 800 may include one or more logically and/or physically connected servers distributed locally or across one or more geographic locations.

One or more users (e.g., via user systems 850) may interact with MTS 800 via network 840. User system 850 may correspond to, for example, a tenant of MTS 800, a provider (e.g., an administrator) of MTS 800, or a third party. Each user system 850 may be a desktop personal computer, workstation, laptop, PDA, cell phone, or any Wireless Access Protocol (WAP) enabled device or any other computing device capable of interfacing directly or indirectly to the Internet or other network connection. User system 850 may include dedicated hardware configured to interface with MTS 800 over network 840. User system 850 may execute a graphical user interface (GUI) corresponding to MTS 800, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 850 to access, process, and view information and pages available to it from MTS 800 over network 840. Each user system 850 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 800 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 850 may be users in differing capacities, the capacity of a particular user system 850 might be determined one or more permission levels associated with the current user. For example, when a salesperson is using a particular user system 850 to interact with MTS 800, that user system 850 may have capacities (e.g., user privileges) allotted to that salesperson. But when an administrator is using the same user system 850 to interact with MTS 800, the user system 850 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 800 that are allocated at the tenant level while other data structures are managed at the user level.

In some embodiments, a user system 850 and its components are configurable using applications, such as a browser, that include computer code executable on one or more processing elements. Similarly, in some embodiments, MTS 800 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VB Script.

Network 840 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 850 may communicate with MTS 800 using TCP/IP and, at a higher network level, use other common Internet protocols to communicate, such as HTTP, FTP, AFS, WAP, etc. For example, where HTTP is used, user system 850 might include an HTTP client commonly referred to as a "browser" for sending and receiving HTTP messages from an HTTP server at MTS 800. Such a server might be implemented as the sole network interface between MTS 800 and network 840, but other techniques might be used as well or instead. In some implementations, the interface between MTS 800 and network 840 includes load sharing functionality, such as round-robin HTTP request distributors to balance loads and distribute incoming HTTP requests evenly over a plurality of servers.

In various embodiments, user systems 850 communicate with application servers 822 to request and update system-level and tenant-level data from MTS 800 that may require one or more queries to data storage 812. In some embodiments, MTS 800 automatically generates one or more SQL statements (the SQL query) designed to access the desired information. In some cases, user systems 850 may generate requests having a specific format corresponding to at least a portion of MTS 800. As an example, user systems 850 may request to move data objects into a particular environment 224 using an object notation that describes an object relationship mapping (e.g., a JavaScript object notation mapping) of the specified plurality of objects.

Exemplary Computer System

Figure 9:
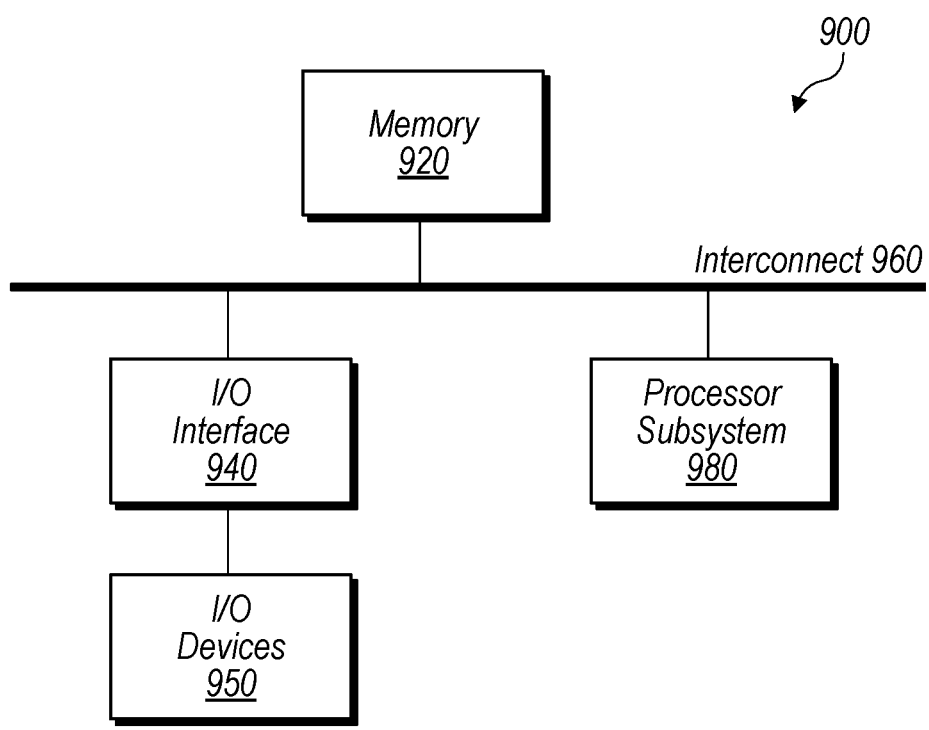
FIG. 9 depicts a block diagram of an exemplary computer system.

Turning now to FIG. 9, a block diagram of an exemplary computer system 900, which may implement cloud environment 100, cloud-based service 105, data storage cluster 120, database node 160, cluster manager 170, MTS 800, and/or user system 850, is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Although a single computer system 900 is shown in FIG. 9 for convenience, system 900 may also be implemented as two or more computer systems operating together.

Processor subsystem 980 may include one or more processors or processing units. In various embodiments of computer system 900, multiple instances of processor subsystem 980 may be coupled to interconnect 960. In various embodiments, processor subsystem 980 (or each processor unit within 980) may contain a cache or other form of on-board memory.

System memory 920 is usable store program instructions executable by processor subsystem 980 to cause system 900 perform various operations described herein. System memory 920 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices 950 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device 950 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other components outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first database node," "second database node," "particular database node," "given database node," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "nodes," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, a node, a system having a processor unit and a memory storing program instructions executable to implement the task, etc. This phrase is not used herein to refer to something intangible.

In some cases, various units/nodes/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A distributed storage system, comprising:
a plurality of data storage servers separated into two or more availability zones, wherein a first availability zone of at least two availability zones includes at least one data storage server that replicates data for at least one data storage server in a second availability zone of the at least two availability zones; and
an auditor located on at least one data storage server, the auditor being operable to:
receive a notification indicating that a data storage server within the second availability zone is down;
determine an availability value for remaining data storage server within the second availability zone having the down data storage server;
determine to not replicate any data stored on any of the data storage server in the second availability zone to the data storage server in the first availability zone when the availability value fails to satisfy a first threshold; and
determine to replicate all of the data stored on the data storage server in the second availability zone to the data storage server in the first availability zone when the availability value satisfies a second threshold, the second threshold being a higher availability value than the first threshold, and wherein the second availability zone is indicated as being up when the availability value satisfies the second threshold.

2. The system of claim 1, wherein the auditor is operable to:
determine whether to replicate all the data stored on the data storage server in the second availability zone having the down data storage server to the data storage server in the first availability zone based on a last known state of the second availability zone when the availability value satisfies the first threshold but fails to satisfy the second threshold.

3. The system of claim 1, wherein the auditor is operable to assess a status of the data storage server to determine whether data storage server is available or data storage server is down.

4. The system of claim 3, wherein the availability value is a percentage of the data storage server in in the second availability zone having the down data storage server that is assessed as being available.

5. The system of claim 1, wherein the first threshold is a predetermined availability value that indicates an availability zone is down when the availability value is below the predetermined availability value.

6. The system of claim 1, wherein the auditor is operable to receive metadata for the data storage server from a cluster manager associated with the plurality of data storage servers.

7. The system of claim 6, wherein the auditor is operable to determine an availability zone that corresponds to a data storage server based on the received metadata.

8. The system of claim 1, wherein the auditor is operable to:
determine that the availability value has failed to satisfy the first threshold for a predetermined time period; and
provide an indication to replicate all the data stored on the data storage server in the second availability zone to the data storage server in the first availability zone in response to the availability value failing to satisfy the first threshold for the predetermined time period.

9. A method, comprising:
receiving, by an auditor located on at least one data storage in a plurality of data storage, a notification indicating that a status of at least one data storage in the plurality of data storage has changed, wherein the plurality of data storage is separated into two or more availability zones, wherein a first availability zone of at least two availability zones includes at least one data storage that replicates data for at least one data storage in a second availability zone of the at least two availability zones, and wherein the changed status data storage is located within the second availability zone;
determining, by the auditor, an availability value for remaining data storage within the second availability zone having the changed status data storage in response to receiving the notification indicating that the status of the data storage has changed;
determining, by the auditor, to not replicate any data stored on any of the data storage in the second availability zone to the data storage in the first availability zone when the availability value fails to satisfy a first threshold, wherein the second availability zone is indicated as being down when the availability value fails to satisfy the first threshold; and
determining, by the auditor, to replicate all the data stored on the data storage in the second availability zone to the data storage in the first availability zone when the availability value satisfies a second threshold, wherein the second threshold is a higher availability value than the first threshold.

10. The method of claim 9, further comprising:
determining, by the auditor, that the availability value satisfies the first threshold but fails to satisfy the second threshold;
assessing, by the auditor, a last known state of the second availability zone having the changed status data storage; and
determining, by the auditor, whether to replicate all the data stored on the data storage in the second availability zone having the changed status data storage to the data storage in the first availability zone based on the assessed last known state.

11. The method of claim 9, wherein the second availability zone is indicated as being up when the availability value satisfies the second threshold.

12. The method of claim 9, further comprising, in response to the availability value failing to satisfy the first threshold:
assessing, by the auditor, whether the availability value has failed to satisfy the first threshold for a predetermined time period; and
determining, by the auditor, to replicate all the data stored on the data storage in the second availability zone having the changed status data storage to the data storage in the first availability zone in response to the availability value failing to satisfy the first threshold for the predetermined time period.

13. The method of claim 12, further comprising providing an indication to an operator to replicate the data from the data storage in the second availability zone having the changed status data storage to the data storage in the first availability zone.

14. A non-transitory computer readable medium that includes program instructions stored thereon that are executable by an auditor located on at least one data storage in a plurality of data storage to cause the auditor to perform operations comprising:

receiving a notification indicating that a data storage in the plurality of data storage is down, wherein the plurality of data storage is separated into two or more availability zones, wherein a first availability zone of at least two availability zones includes at least one data storage that replicates data for at least one data storage in a second availability zone of the at least two availability zones, and wherein the data storage indicated as being down is located within the second availability zone;

determining an availability value for remaining storage within the second availability zone having the down data storage in response to receiving the notification indicating that the data storage is down;

determining to not replicate any data stored on any of the data storage in the second availability zone to the data storage in the first availability zone when the availability value fails to satisfy a first threshold, wherein the second availability zone is indicated as being down when the availability value fails to satisfy the first threshold; and determining to replicate all the data stored on data storage in the second availability zone to the data storage in the first availability zone when the availability value satisfies a second threshold, the second threshold being a higher availability value than the first threshold.

15. The non-transitory computer readable medium of claim 14, wherein the program instructions are executable by the auditor to cause the auditor to perform operations comprising:

determining that the availability value satisfies the first threshold but fails to satisfy the second threshold; and determining whether to replicate all the data stored on the data storage in the second availability zone having the down data storage to the data storage in the first availability zone based on an assessed last known state of the availability zone having the down data storage.

16. The non-transitory computer readable medium of claim 14, wherein the program instructions are executable by the auditor to cause the auditor to perform operations comprising:

determining an availability zone that corresponds to a data storage based on metadata for the data storage received from a cluster manager associated with the data storage.

17. The non-transitory computer readable medium of claim 14, wherein the program instructions are executable by the auditor to cause the auditor to perform operations comprising:

assessing whether the availability value has failed to satisfy the first threshold for a predetermined time period; and providing an indication to replicate all the data stored on the data storage in the second availability zone having the down data storage to the data storage in the first availability zone in response to the availability value failing to satisfy the first threshold for the predetermined time period.

18. The system of claim 1, wherein the availability value for remaining data storage within the second availability zone having the down data storage is an availability value of the data storage within the second availability zone other than the down data storage.

19. The non-transitory computer readable medium of claim 14, wherein the availability value for remaining data storage within the second availability zone having the down data storage is an availability value of the data storage within the second availability zone other than the down data storage.

20. A non-transitory computer readable medium that includes program instructions stored thereon that are executable by an auditor located on at least one data storage in a plurality of data storage to cause the auditor to perform operations comprising:

receiving a notification indicating that a data storage in the plurality of data storage is down, wherein the plurality of data storage is separated into two or more availability zones, wherein a first availability zone of at least two availability zones includes at least one data storage that replicates data for at least one data storage in a second availability zone of the at least two availability zones, and wherein the data storage indicated as being down is located within the second availability zone;

determining an availability value for remaining data storage within the second availability zone having the down data storage in response to receiving the notification indicating that the data storage is down;

determining to not replicate any data stored on any of the data storage in the second availability zone to the data storage in the first availability zone when the availability value fails to satisfy a first threshold; and determining to replicate all the data stored on data storage in the second availability zone to the data storage in the first availability zone when the availability value satisfies a second threshold, the second threshold being a higher availability value than the first threshold, and wherein the second availability zone is indicated as being up when the availability value satisfies the second threshold.

\* \* \* \* \*